UNITED STATES PATENT OFFICE.

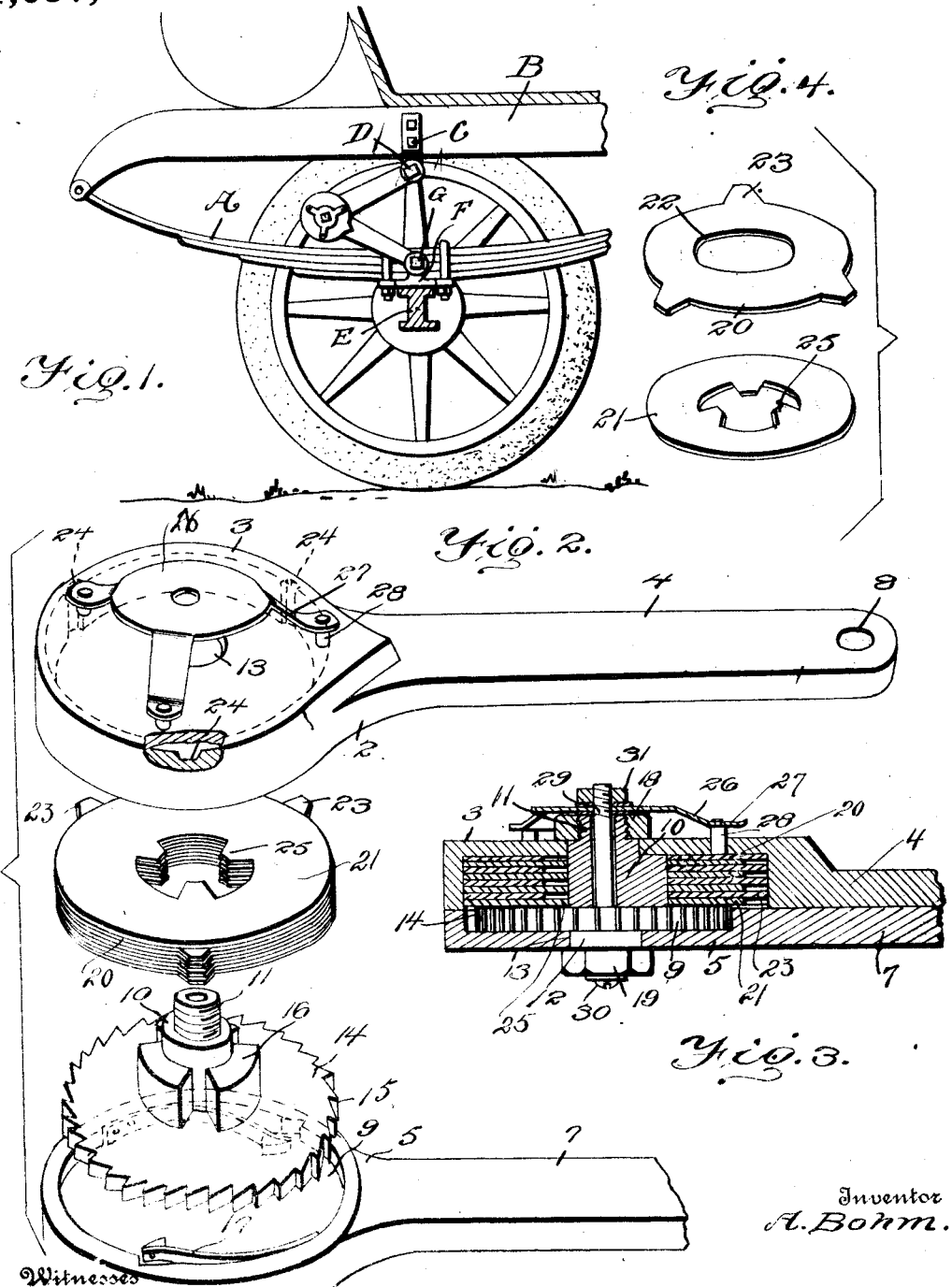

ANDREW BOHM, OF MORRISTOWN, NEW JERSEY.

SHOCK-ABSORBER FOR AUTOMOBILES.

1,057,030.  Specification of Letters Patent.  Patented Mar. 25, 1913.

Application filed October 21, 1911. Serial No. 655,918.

*To all whom it may concern:*

Be it known that I, ANDREW BOHM, citizen of the United States, residing at Morristown, in the county of Morris and State of New Jersey, have invented certain new and useful Improvements in Shock-Absorbers for Automobiles, of which the following is a specification.

My invention relates to automobile appliances and particularly to devices designed to take up shock, and relieve the springs of the automobile from too sudden flexure.

The primary object of my invention is the provision of a very simple and yet effective shock absorber which may be easily applied to any automobile of ordinary type, and which while yielding to a downward movement of the body, frictionally resists the upward movement thereof, thus preventing any violent recoil of the springs.

Another object is to provide a shock absorber in which the movement of the vehicle body in one direction is resisted by frictional engagement of the members, and in this connection to so construct the shock absorber as to provide a very large area of frictional engaging surface.

A further object is to provide a shock absorber of the character above referred to in which the amount of frictional resistance may be readily regulated, and further to provide in this connection a means for resiliently controlling the amount of pressure or frictional resistance between one friction element and the next adjacent element.

A further object is to provide a shock absorber in which advantage is taken of the frictional contact existing between the number of relatively thin plates pressed into relatively tight engagement with each other and rotating in opposite directions.

Further objects will appear in the course of the following description.

An embodiment of my invention is illustrated in the accompanying drawings wherein:

Figure 1 is a longitudinal sectional view of a portion of an automobile showing my shock absorber applied thereto. Fig. 2 is a perspective view of the shock absorber, the several parts being separated from each other. Fig. 3 is a fragmentary sectional view of the absorber. Fig. 4 is a perspective detail view of two of the friction plates separated from each other.

Corresponding and like parts are referred to in the following description and indicated in all the views of the accompanying drawings by the same reference characters.

Referring more particularly to Figs. 2 and 3, it will be seen that my shock absorber includes two separate elements pivoted to each other, one connected to the body of the vehicle and the other to the axle or allied part, the two elements rotating about a common pivot when the body is shifted relative to the axle in either direction. One of these elements is designated 2 and comprises a relatively circular head 3 and an arm 4. The other element is designated 5 and comprises a relatively circular head 6 and an arm 7. The extremities of the arms 4 and 7 are perforated as at 8 for the passage of bolts, screws or other means whereby the extremities of the arms may be connected respectively, one with the body of the vehicle and the other with the axle thereof. The head 3 is hollowed out to form a circular chamber as best seen in Fig. 3, this chamber being relatively deep while the head 5 is hollowed out as at 9 to form a relatively shallow chamber within which a ratchet wheel is contained as will be later described.

Disposed within the chamber formed by the hollow heads 3 and 6 is a barrel 10 having reduced ends 11 and 12, these reduced ends fitting in bearings 13 formed in the heads so that the barrel will rotate within the heads. Attached to one end of the barrel is a ratchet wheel 14, the circumference thereof being provided with ratchet teeth 15. The barrel is formed with a plurality of radial projecting lugs 16. As illustrated, there are three radial lugs or wings 16 but I do not wish to limit myself to this number. These lugs are of course less than the length of the barrel. The ratchet wheel is fixed upon the barrel so as to rotate therewith.

The interior face of the wall of the head 6 is formed with spring pawls 17 at opposite points in its diameter which engage with the ratchet teeth. These spring pawls permit a movement of the arm 7 in one direction independent of the ratchet wheel 14 but engage with the ratchet wheel upon a movement of the arm in the opposite direction so that the arm, ratchet wheel and barrel will turn together. The extremities of the barrel are reduced and exteriorly screw threaded for engagement with the nuts 18 and 19.

Disposed within the casing formed by the heads 3 and 6 are a plurality of friction plates designated respectively 20 and 21. The plates 20 are annular in form and have a central opening 22 large enough to loosely surround the outer curved faces of the lugs 16 so that the plates 20 may rotate freely upon the barrel being supported and centered by said lugs. The plates 20 are provided with radial projecting peripheral lugs 23 which engage in radial recesses 24 formed in the walls of the head 3. It will thus be seen that the plates 20 by reason of this engagement between the radial teeth 23 and the radial recesses 24 will rotate with the member 2. The plates 21 do not have any peripheral lugs but are annular in form and have inwardly extending radial teeth 25. These teeth engage between the lugs 16. It will be obvious, therefore, that the plates 21 will rotate with the barrel 10, and therefore, with the arm 7, when the arm 7 is moved in such direction that the pawls 17 will engage with the teeth 15. These plates 20 and 21 are placed alternately to each other so that when the friction plates are assembled as shown in Fig. 2, half of the plates will engage with the head 3 while the other or alternate plates will engage with the barrel 10. It will be obvious that when the arms 4 and 7 are moved in opposite directions that the plates will be oppositely rotated, and that the frictional contact between these plates will act to resist the movement of the plates and per consequence the movement of the arms 4 and 7. If the barrel 10 were rigidly connected to the arms 7, this frictional resistance would occur not only when the arms were moving away from each other as by a movement of the body of the vehicle away from the axle due to a rebound of the vehicle body under the action of the springs, but would also occur when the arms were moving toward each other. In order to avoid any frictional resistance acting against the downward movement of the vehicle body, I have not mounted the barrel 10 rigidly upon the head but have provided the pawls 17 and the ratchet wheel 14 so that when the arms move toward each other the pawls 17 will slide over the teeth 15, and as a consequence the barrel 10 with the friction disks 21 will not be moved oppositely to the friction disks 20 but will move therewith. Thus upon an expansion of the bowed springs A which support the vehicle body, the arms will be rotated upon a common pivot so as to force the free ends of the arms away from each other. Under these circumstances, the friction plates will act to impede the movement of the parts and thus reduce the recoil of the springs. As the body moves downward, however, the friction disks will not act and the spring will be free to act.

The nuts 18 and 19 merely act to hold the heads abutted against each other, but for the purpose of controlling the degree of pressure between the disks 20 and 21, I provide a resilient means for forcing the disks toward each other and exerting therefore a spring pressure upon the disks. This means is very clearly shown in Figs. 2 and 3. It consists of a spider 26 which has a plurality of radially projecting spring arms 27, each carrying at its end an inwardly extending pin 28, preferably though not necessarily formed of steel. These pins 28 pass through perforations in the head 3 and are freely movable in said perforations. The inner ends of the pins 28 bear frictionally against the adjacent disk 21.

Passing through the barrel 10 is a bolt 29 having a head 30 at one end which passes through the reduced end of the barrel and at the other end is screw threaded for engagement with a nut 31 which bears upon the disk which forms a center of the spider 26. Under these circumstances, it will be seen that by tightening the nut 31, the spider will be resiliently forced toward the adjacent head 3 and the studs 28 will be forced resiliently against the outermost disk of the series of disks 20 and 21, and that the resilience of the arms 27 will resiliently force these disks in frictional engagement with each other. By tightening or loosening the nut 31, the degree of strength with which the disks 20 and 21 are resiliently forced toward each other may be regulated to any desired extent.

While I have shown what I believe to be the most effective details of my construction, I do not wish to be limited to this as it is obvious that the principle of the invention might be embodied in other forms without departing from the spirit thereof. For instance, I preferably form the disks 20 and 21 of copper but disks of other metal or of other material might, however, be used in place of copper if so desired.

It will be obvious that if the disks wear, the two members of the device may be readily taken apart and the disks removed or replaced. It will also be seen that in case the shock absorber works too stiffly, the tension on the several disks may be relieved, while if the parts work loosely, the pressure with which the disks are forced against each other may be increased. It will be plain too that my invention is very simple, that the internal parts are not in any way complicated, and that the frictional engaging members are completely housed so that dust and dirt can not accumulate within the chamber formed by the heads 3 and 5 nor collect between the plates. Further, it will be seen in this connection that the nuts 18 and 19 being larger than the reduced ends of the barrel 10 will act to protect the bearing within which the barrel 10 operates and prevent the introduction of dust through these bearings.

I of course do not wish to be limited to any particular arrangement whereby this device may be connected to a vehicle. In Fig. 1, however, I have shown a frame bar B of the automobile as being provided with the downwardly projecting bracket C having an outwardly projecting pivot pin D which passes through the perforation 8 in the end of arm 7, and have also shown the axle E as being provided with an upwardly projecting bracket F of any suitable character and having a pivot bolt G passing through the perforation 8 in the end of the arm 4.

The operation of my invention will be obvious from what has gone before. Upon a depression of the body, the friction disks will all rotate together and there will be practically no impedance to the downward movement of the body relative to the axle. Upon a rebound of the body, however, under the action of the springs, the friction disks will be thrown into action and will resist the upward movement of the body, thus preventing any violent recoil of the springs.

What I claim is:

1. A shock absorber including abutting members rotatable in opposite directions about a common axis, a barrel disposed between said members, one of said members being freely rotatable with relation to the barrel in both directions, the other of said members engaging with the barrel upon movement in one direction but disengageable therefrom upon movement in the other direction, and a plurality of friction disks disposed between the members surrounding the barrel and being in frictional contact with each other, alternate disks having inwardly projecting lugs engaging with the barrel, the others of said disks having outwardly projecting lugs engaging with the freely rotating abutting member.

2. A shock absorber including two hollow abutting heads each having a radially extending arm, a ratchet wheel supported in one of said heads and independently rotatable with relation thereto, a pawl carried by said head and engaging the ratchet wheel for movement in one direction but disengageable therefrom on movement in the other direction, a barrel extending from the center of said ratchet wheel and having radially projecting lugs, said barrel being journaled in the opposed head and being concentric thereto, the last named head being formed on its inside face with radially disposed notches, and a plurality of friction disks disposed between the heads and in frictional contact with each other, alternate disks having teeth engaging respectively with the barrel and with the notches in said head.

3. A shock absorber including abutting hollow heads having radially extending arms, said heads rotating about a common center, one of said heads being formed on the inside face of its circumferential wall with a plurality of notches, a pawl mounted on the inside face of the other of said heads, a ratchet wheel disposed in the last named head and having teeth with which said pawl engages, a barrel carried upon said ratchet wheel journaled in the center of the other head, said barrel being radially notched, means engaging the barrel for holding the heads in engagement with each other, and a plurality of friction disks disposed in one of said heads engaging the face of the ratchet disk on the other head and surrounding said barrel, alternate disks having teeth engaging the barrel and the notched head respectively.

4. A shock absorber including two abutting hollow heads, each having a radially extending arm, said heads rotating about a common center, and one of said heads being formed on its inner side face with a plurality of notches, a bolt passing through both of said heads and constituting the axis for the same, a barrel rotatably mounted upon the bolt and freely rotatable with relation to the notched head, a disk mounted upon the end of the barrel opposite the last named head, the adjacent head being recessed to receive said disk, means for engaging said disk with said recessed head upon a movement of the head and corresponding arm in one direction and disengaging therewith upon a movement of the head and corresponding arm in another direction, and a plurality of friction disks disposed in the notched head and surrounding said barrel, alternate disks having teeth engaging the barrel and the notched head respectively.

5. A shock absorber including oppositely disposed abutting members rotatable in opposite directions around a common center, a plurality of friction disks disposed between the members and in frictional contact with each other, alternate disks being rotatably connected to each other respectively, a spider mounted upon one of said members and having resilient arms, studs carried by said arms passing through said member and engaging the face of the adjacent friction disk to urge the friction disks into contact with each other, and an adjusting bolt passing through the heads and engaging said spider and adjustable to increase or reduce the pressure of said spring arms.

6. A shock absorber including abutting heads, one of said heads being radially notched upon its interior face, each having a radially extending arm, a bolt passing through the axes of the heads, a barrel surrounding the bolt, and radially notched, said barrel having a disk fixed thereto at one end frictionally contacting with one of said heads, the opposite end of the barrel being reduced and journaled in the other of said heads, the terminal end of the barrel being further reduced and exteriorly screw threaded for engagement with a nut, a plurality of friction disks between the first named disk and the last named head, alternate disks having teeth, engaging the barrel and the notched head respectively, and means on the other head for engaging with the first named disk upon a movement of the head in one direction but disengaging therefrom upon a movement of the head in another direction.

In testimony whereof I affix my signature in presence of two witnesses.

ANDREW BOHM. [L. S.]

Witnesses:
CHRISTIAN THOMPSON,
JOHN HELSTROM.